United States Patent [19]
Brolund et al.

[11] Patent Number: 5,763,852
[45] Date of Patent: Jun. 9, 1998

[54] PUNCH PRESS WITH AUXILLARY HIGH-ENERGY THERMAL CUTTING DEVICE AND IMPROVED SLAG COLLECTION SYSTEM

[75] Inventors: Theodore F. Brolund, Rockford; James W. Orr, Jr., Byron, both of Ill.

[73] Assignee: W.A. Whitney Co., Rockford, Ill.

[21] Appl. No.: 711,724

[22] Filed: Sep. 4, 1996

[51] Int. Cl.$^6$ ............................................. B23K 10/00
[52] U.S. Cl. ........................... 219/121.44; 219/121.39; 219/121.58; 219/121.59
[58] Field of Search ................. 219/121.39, 121.44, 219/121.37, 121.43, 121.58, 121.59, 121.67, 121.7, 121.86; 55/257.1, 260

[56] References Cited

U.S. PATENT DOCUMENTS

| | | | |
|---|---|---|---|
| 4,063,059 | 12/1977 | Brolund et al. | 219/68 |
| 4,338,507 | 7/1982 | Scott | 219/121 |
| 4,358,300 | 11/1982 | Schlapman et al. | 55/245 |
| 4,441,934 | 4/1984 | Kawakami et al. | 148/9 R |
| 4,464,184 | 8/1984 | Cera et al. | 55/21 |
| 4,550,241 | 10/1985 | Scott et al. | 219/121 |
| 4,591,454 | 5/1986 | Ohtsuka et al. | 252/626 |
| 5,053,600 | 10/1991 | Chun et al. | 219/121.48 |
| 5,079,403 | 1/1992 | Sturges et al. | 219/121.5 |
| 5,132,510 | 7/1992 | Klingel et al. | 219/121.82 |
| 5,266,775 | 11/1993 | Brolund et al. | 219/121.39 |

*Primary Examiner*—Mark H. Paschall
*Attorney, Agent, or Firm*—Leydig, Voit & Mayer, Ltd.

[57] ABSTRACT

A punch press having a high-energy, thermal melting device and an improved slag recovery system. The punch press is a bridge-type machine in which the workhead which carries the ram of the punch press and the melting tool moves along a first axis, and the workpiece is moved along a second orthogonal axis. The slag collection system is static for simplistically, economically, and reliably collecting the slag created by the melting tool, and includes a long, slot-like opening congruent with the path of the melting tool. The slot-like opening is in the top of a stationary plenum provided below the workpiece and extends down to an open bottom where a slag tray is provided to collect the slag. A vacuum source is connected to the plenum to draw gases through the slot-like opening and into the plenum for removal. A spark trap is interposed between the vacuum source and the plenum to prevent sparks from entering the vacuum source and causing a fire or explosion.

16 Claims, 4 Drawing Sheets

PUNCH PRESS WITH AUXILLARY HIGH-ENERGY THERMAL CUTTING DEVICE AND IMPROVED SLAG COLLECTION SYSTEM

FIELD OF THE INVENTION

The present invention generally relates to machine tools for cutting or stamping shapes into metal stock, and more particularly relates to punch presses employing auxiliary high-energy thermal melting devices which cut patterns from the metal stock.

BACKGROUND OF THE INVENTION

Metal sheet stock can be cut and stamped in a variety of ways. Traditionally, small to medium sized patterns have been made in a sheet of metal through a punch press with a specifically shaped ram which cooperates with a die to stamp the metal stock and punch a correspondingly shaped pattern in the metal sheet. However, if the shape is relatively large, or has an irregular shape, or is one which needs to be dynamically changed, a traditional punch press is rather unwieldy, and the art has come to use a high-energy metal melting tool, such as a plasma torch or a laser for such situations.

The plasma torch is most typically employed, and an embodiment of the invention will be described in connection with a plasma torch. However, it will be realized that the present invention is also fully applicable for use with a high-energy laser, and such use is intended to be within the scope of the invention. A plasma torch operates by ionizing a column of gas with an electric arc to produce temperatures of up to 30,000° F. A high-velocity, high-temperature plasma stream and electric arc strike the workpiece with the heat serving to instantly melt the metal while the high-velocity stream blows away the molten metal.

Given the need for both types of metal processing, (i.e., punching and cutting), the prior art has developed machine tools which combine a punch press with a plasma cutting torch. Brolund, U.S. Pat. No. 4,063,059, discloses such an apparatus. The plasma torch instantly melts the metal being processed and directs a stream of molten metal downward through the table wherein a stationary duct directs the molten metal from the table to a collection bin. When the cutting tool is a laser, as disclosed in Scott U.S. Pat. No. 4,550,241, a pressurized stream of cutting gas such as oxygen, air, or an inert gas is directed toward the tip of the tool. Certain cutting gases such as oxygen coact with the laser beam to form an exothermic reaction and increase the cutting speed and effectiveness of the laser.

However, with such a press the table must be equipped with a means for moving the workpiece beneath the torch for proper positioning of the cut. Since the metal workpieces can be extremely heavy, this tends to stress the clamps holding the workpiece and often results in inaccurate positioning of the workpiece due to deformation of the clamps, or slippage of the workpiece in the clamps. Presses have therefore been developed wherein the workhead, which carries the torch and punch, move under numerical control along a first (or Y) axis, and the clamps (which carry the workpiece) move under numerical control along the other (or X) of the orthogonal axes. This has resulted in not only a more accurate machine, but also one which is able to accommodate a wider range of workpiece weights and thicknesses.

With any punch press having plasma or laser cutting capability, including the ones mentioned herein, a mechanism needs to be provided to collect the slag (molten metal) created from the cutting of the metal. With presses employing a stationary torch, the collection system can be relatively simple wherein a stationary duct communicates the slag from the workpiece to a stationary collection bin. However, when the torch is mounted for numerically controlled movement, the slag collection system must be able to move accordingly, or otherwise accommodate positioning of the torch. Systems have been developed wherein the slag collection system moves with the torch, but have proven to be rather expensive and somewhat cumbersome.

In addition to the creation of slag, high-velocity, high-temperature plasma streams tend to create a relatively large amount of gas and fumes, and prior art devices have therefore employed vacuum sources disposed in communication with the duct leading to the molten metal collection bin. Since the molten metal is extremely hot and capable of generating sparks, it has been found that such sparks can be drawn into the vacuum source. This can potentially lead to a explosion or fire within the vacuum source.

Finally, in machines adapted for high production rates, where cutting cycles can be extended, a large quantity of slag can be created. Steps must be taken to render the slag collection system compatible with such a high level of slag production. Scott U.S. Pat. No. 4,338,507 discloses one such system wherein a water filled tank is disposed below the worktable. The slag is discharged into the water which cools the slag and washes the slag from the inside of the discharge duct. Fumes are also discharged into the water and are thereby quenched and cleaned before bubbling up for removal by a vacuum source. This system has proven to be effective, but is rather expensive to manufacture and maintain.

SUMMARY OF THE INVENTION

It is a primary objective of the present invention to provide a punch press having metal melting capability, wherein a workhead which carries a melting tool is mounted for numerically controlled indexing along one of two orthogonal axes, and in which the punch press includes a stationary slag collection system which reliably and safely collects slag and gases from a numerically controlled cutting operation without the necessity for movement of the slag collector.

In that regard, it is a feature of the present invention to provide an elongate slot in the worktable which extends from its front edge to its back edge (along the Y axis), as well as a plenum leading from the slot to a slag tray wherein the plenum and the slag tray are dimensioned to span across the entire Y axis of the worktable. Therefore, regardless of the position of the cutting tool, the molten metal resulting from its operation will be communicated from the workpiece to the slag tray.

Another feature of the present invention to accomplish the foregoing is to provide a punch press featuring a slag collection system which is simple in construction in that it requires no movement during a numerically controlled cut, yet reliably removes slag even during complex servo controlled cuts.

Another feature of the present invention to accomplish the foregoing is to provide a punch press featuring a slag collection system which is simple in construction, safe in operation, and requires no indexed movement as the punch press performs a complex numerically controlled cut.

Another objective of the present invention is to provide a slag collection system for a punch press having a high-energy, thermal melting device which is able to remove a high volume of slag, which is not likely to become clogged, which substantially eliminates the possibility of sparks being transmitted from the system, which is simple in construction, and which is static.

A feature of the present invention to accomplish the above identified objective is to provide a plenum having an open top and bottom, angled walls leading from top to the bottom, and a collection tray below the open bottom for collection of the slag. The angled walls are provided with removable baffle plates treated with a slag repelling coating to prevent accumulation of slag and clogging of the system.

Another feature of the invention to accomplish the foregoing is to provide a labyrinthine spark trap in an extension of the plenum wherein a vacuum source draws from the plenum through the spark trap. The spark trap creates a maze-like flowpath which hinders the passage of sparks from the plenum to the vacuum source and thereby avoids explosions and fires.

A still further objective of the present invention is to provide slag collection system which provides stationary supports close to the cut to resist sagging of the workpiece, but also provides a quick and efficient part removal mechanism for discharging parts from the worktable once the punching or cutting operation is completed.

A feature of the present invention to accomplish the foregoing is to provide a worktable comprised of a stationary portion and a discharge portion wherein the discharge portion is provided with a mechanism for lowering and tilting its surface, and the slag collection system includes a pair of workpiece supports in the plane of the table which define an elongate slot for downward passage of slag. The workpiece supports support the workpiece along the cut to avoid sagging in the workpiece.

These and other objectives and advantages of the present invention will become more apparent from the following detailed description when taken in conjunction with the accompanying drawings.

DETAILED DESCRIPTION OF THE PREFERRED EMBODIMENT

Figure 1:
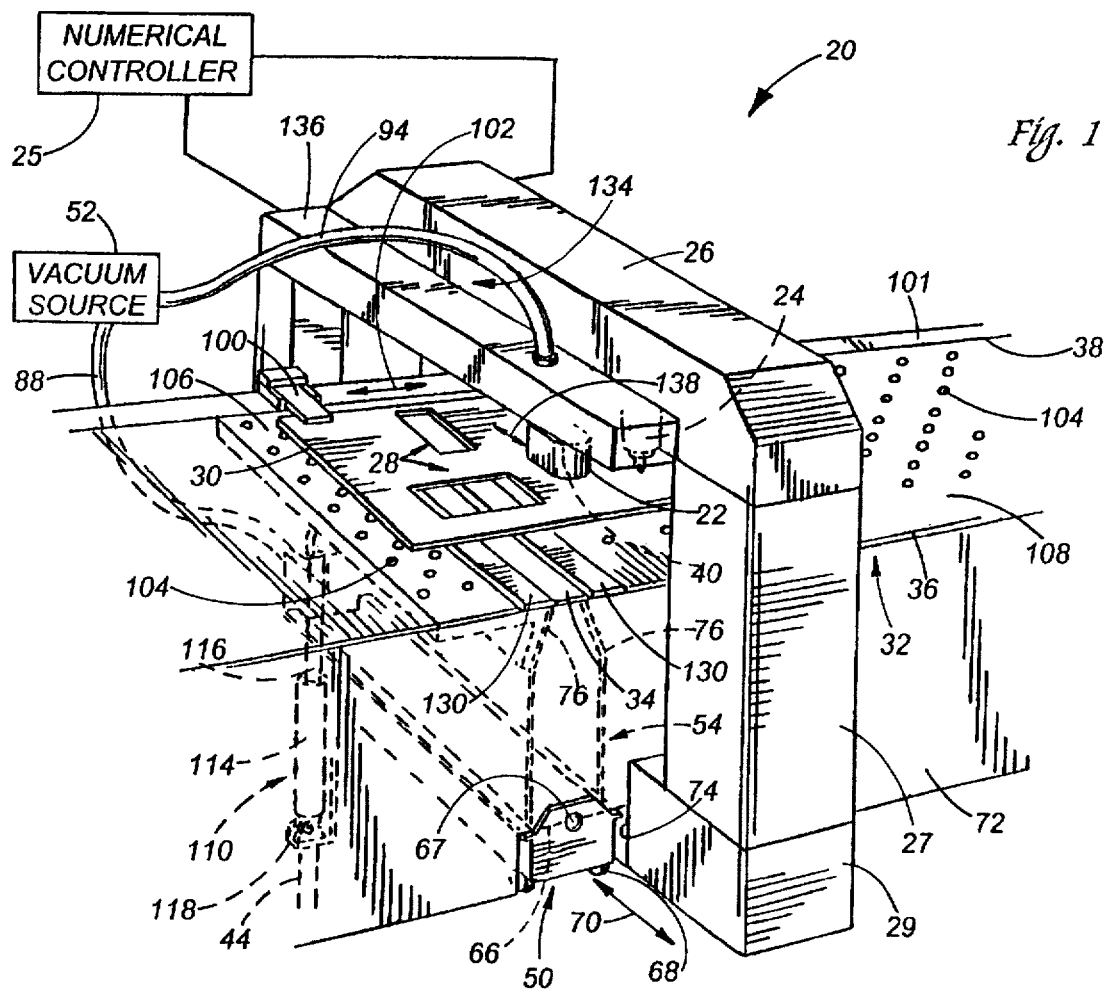
FIG. 1 is a fragmentary perspective view of the present invention showing the cutting tool mounted to move along the Y axis, as well as the elongate slot, plenum, and slag tray positioned to receive the slag along the entire Y axis of the worktable.

Referring now to the figures, and specifically to FIG. 1, punch press 20 of the present invention is shown in perspective. Punch press 20 includes a metal melting tool shown herein as plasma torch 22 mounted alongside ram 24. Plasma torch 22 and ram 24 are both mounted in overhead bridge 26, which is supported by frame 27 and base 29. Punch press 20 is designed to punch via ram 24, and/or cut via plasma torch 22, patterns 28 into metal workpiece 30. The positioning of plasma torch 22 and ram 24 (and a corresponding die disposed below the table which progresses with ram 24) along the Y axis are controlled by servo drives (not shown) which themselves are controlled by numerical controller 25.

Also referring to FIG. 1, workpiece 30 is supported on table 32 provided below plasma torch 22 and ram 24. Table 32 includes elongate, adjustable-width slot 34 which spans from front edge 36 to back edge 38 of table 32, this direction defining the Y axis of the table 32. Slot 34 is provided as a means by which slag 48 cut from workpiece 30 is removed from table 32.

It is to be understood that plasma torch 22 is of a conventional design and commercially available. Basically, such a torch includes a tip 40 defining a small orifice through which an ionized column of gas and an electric arc are forced. Plasma stream and the electric arc 42 are discharged from the orifice at high velocity and produce extremely high temperatures to cause instantaneous melting of the underlying portion of workpiece 30. This process makes a clean, high speed cut with little slag formation and is generally accepted as the preferred method of cutting sections up to six inches thick from stainless steel and non-ferrous or clad metals that are not easily cut by oxygen fuel gas processes.

With the present invention ram 24 can be used to form small and medium sized holes in workpiece 30, while plasma torch 22 can be used to rapidly cut larger holes and to form irregularly shaped openings. Also, ram 24 may be used to form a starting hole in workpiece 30 or sections to be cut by torch 22 and thereby eliminate direct downward impingement of plasma-arc 42 on solid metal. This reduces the danger of tip 40 becoming plugged by metal which otherwise might splatter upwardly upon initial contact of the plasma-arc 42 with the workpiece 30. Because both ram 24 and torch 22 are provided on a single punch press 20, both punching and cutting of workpiece 30 can be effected with a single program and without the need for transferring workpiece 30 from station to station between the punching and cutting operations.

Figure 2:
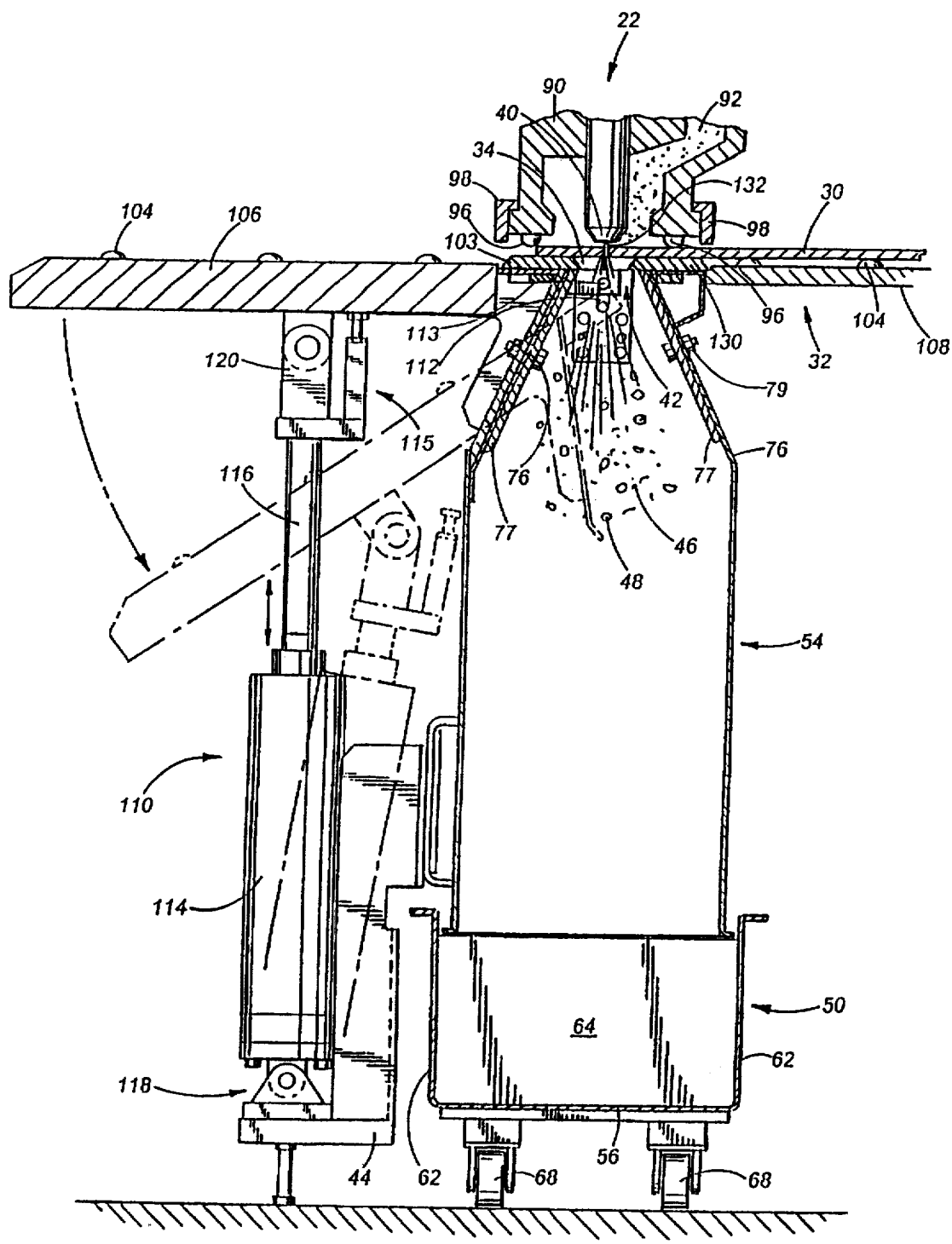
FIG. 2 is a partial sectional view of the present invention showing the operation of a plasma torch as well as the motion of the discharge portion of the worktable.
Figure 6:
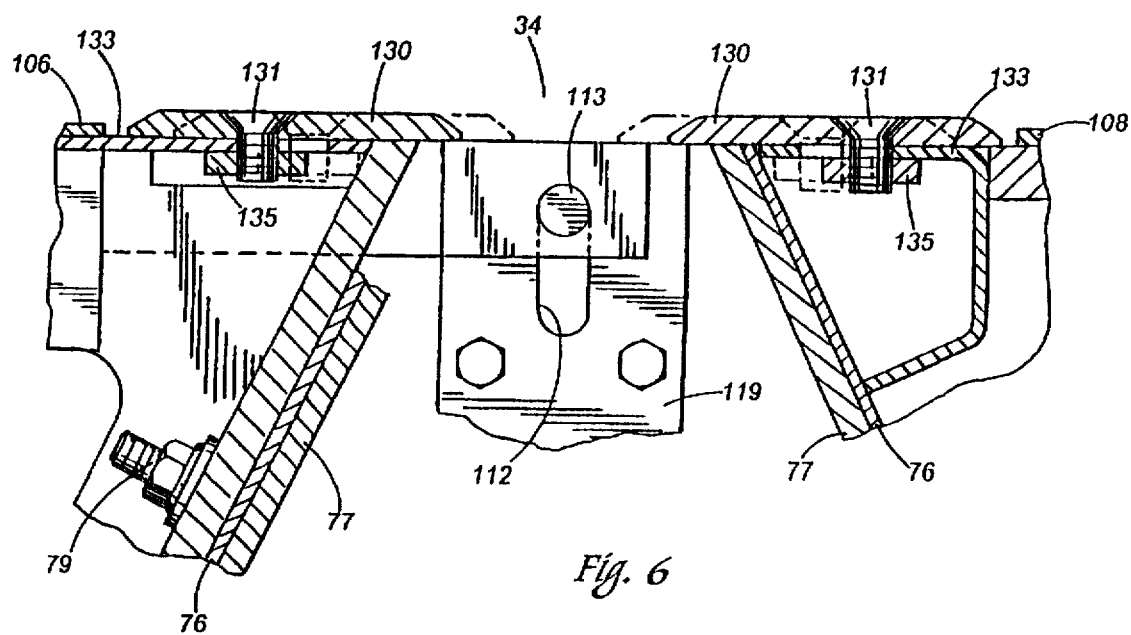
FIG. 6 is a partial sectional view a taken along line 6—6 of FIG. 5.

During operation of melting tool 22, fumes and particles 46 as well as slag 48 are produced. Slag 48 is collected beneath table 32 via slag tray 50, while gases and particles 46 are disposed of by vacuum source 52. Plenum 54 extends from slot 34 to tray 50 and is provided as wide as slot 34 so as to be as wide as the range of melting tool 22. Plenum 54 is stationary and includes open bottom 55 to allow slag 48 to fall through to tray 50. To receive slag 48 and to prevent the escape of slag 48 or fumes resulting from the cutting, plenum 54 includes angled portions 76 to direct the slag and fumes downward. As best shown in FIG. 2, plasma stream 42 fans outward and tends to force slag 48 into contact with angled portions 76. Angled portions 76 are therefore provided with replaceable baffle plates 77 mounted thereto. In the preferred embodiment baffle plates 77 are manufactured from steel plate with a slag repellent coating, and most preferably the coating is a chromium alloy finish. Bolts 79 are used to fasten baffle plates 77 to angled portions 76. Although bolts 79 are depicted as extending inward and beyond the surface of plates 77 in FIG. 2, it is to be understood that the preferred embodiment includes bolts 79, as shown in FIG. 6, which are countersunk or otherwise provided to be flush with the surface of plates 77 so as to prevent slag 48 from collecting on bolts 79.

Figure 4:
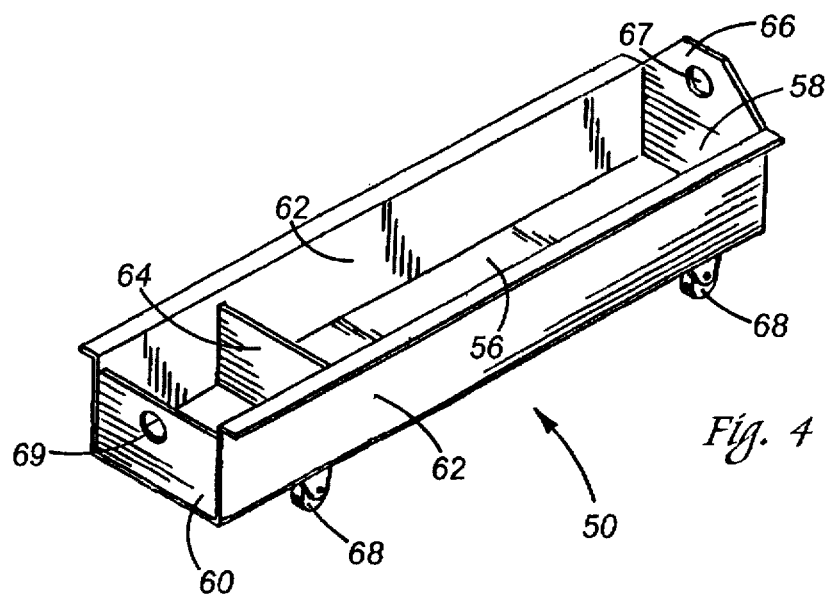
FIG. 4 is a perspective view of the slag tray.

Slag 48 drops from workpiece 30, through plenum 54, and into slag tray 50. As best shown in FIG. 4, slag tray 50 includes bottom 56, front 58, back 60, two opposed sides 62, and partition 64. As shown both in FIGS. 1 and 4, front 58 includes enlarged handle portion 66 with aperture 67, back 60 includes aperture 69, and casters 68 are mounted onto bottom 56 to facilitate removal and/or insertion of waste receptacle 50. Apertures 67 and 69 are provided to receive hooks or similar grasping mechanisms whereby a crane can be used to empty tray 50. As shown in FIG. 1, slag tray 50 moves in the direction depicted by arrow 70 when it is to be emptied and/or repaired. Punch press 20 also includes front shroud 72 provided with entranceway 74 which allows slag tray 50 to be moved in and out.

With certain prior art devices, the molten metal produced by the melting tool is collected in a small, stationary bin to which a vacuum source is directly connected. The vacuum source draws gases and fine particles out of the collection bin to reduce the emissions of the machine tool. However, sparks and/or the molten metal itself can be communicated from the collection bin to the vacuum source and can potentially ignite the vacuum source to thereby cause an explosion. Alternatively, a water-quenched or otherwise controlled collection area is provided with a relatively small area from which a vacuum needs to draw away gases. With the present invention however, plenum 54 provides a relatively large, and somewhat uncontrolled collection area from which the vacuum source must collect gases. This necessitates a vacuum system which not only is able to collect from such a large, non-centralized location, but which is also provided with a mechanism for preventing sparks from entering the vacuum source. The present invention provides such a system with vacuum source 52 and its location relative to plenum 54 and spark trap 78.

Figure 3:
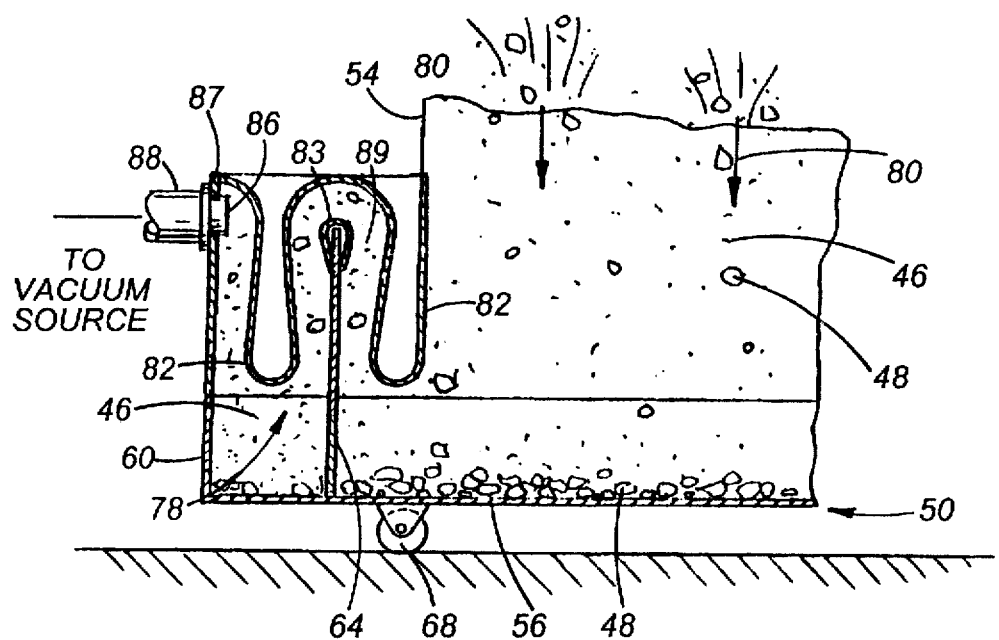
FIG. 3 is a partial sectional view of the plenum and slag tray showing the flow path of the slag and gases produced from operation of the cutting tool through the labyrinthine spark trap.

More specifically, as best shown in FIG. 3, slag 48 and particles 46 descend along the pathway depicted by arrows 80 through plenum 54. Relatively heavy slag 48 collects on bottom 56 of slag tray 50, whereas relatively light, and possibly flaming, particles 46 are drawn away from slag tray 50 by vacuum source 52. To prevent communication of sparks or slag 48 to vacuum source 52, slag tray 50 is provided with partition 64 while plenum 54 includes cavity 81 in which spark trap 78 is disposed. Spark trap 78 is comprised of sheet metal formed into arcuate protrusions 82. Protrusions 82 are shaped in such a manner so as to provide a smooth flowpath for the gases traversing therethrough. As best shown in FIG. 3, two protrusions 82 are formed in the preferred embodiment with a third barrier 83 being formed by a separate piece of sheet metal. Protrusions 82 and barrier 83 extend between sides 87 of cavity 81. Barrier 83 and tray partition 64 cooperate to form a continuous wall in operation. Slag tray 50 includes dropout areas 51 which collect particles removed by protrusions 82.

Also shown in FIG. 3, a hose or similar conduit 88 in communication with vacuum source 52 is attached to cavity outlet 86. Outlet 86 is positioned above slag tray 50 to create a flowpath wherein gases are forced to rise and fall repeatedly before ultimately reaching outlet 86. Any particles or sparks also being drawn by vacuum source 52 are either blocked by protrusions 82, or burn out while floating through spark trap 78. Although labyrinthine spark trap 78 is shown having a series of turns in its flow path, it is to be understood that the present invention encompasses other maze-like spark trap configurations. Also, in the preferred embodiment the cross-sectional area of each flow path channel 89 is provided as at least one half the crosssectional area of hose 88, but it is to be understood that other dimensional configurations are possible.

Referring now to FIG. 2, plasma torch 22 is shown having nozzle 90 surrounding torch tip 40, with upper vacuum plenum 92 disposed therebetween. Vacuum plenum 92 is in communication with second vacuum hose 94 shown in FIG. 1. Plasma torch 22 is also provided with guide rollers 96 and guards 98 to facilitate smooth movement of workpiece 30 beneath plasma torch 22. Therefore, when workpiece 30 is traversed over table 32 from left to right via clamps 100, guide rollers 96 roll along the top surface of workpiece 30. Clamps 100 move along rail 101 via servo control. Rail 101 defines the X axis of machine tool 20. This direction of travel is depicted by arrow 102 shown in FIG. 1. The lateral travel of workpiece 30 is also facilitated by a plurality of conveying rollers 104 provided on table 32.

Figure 5:
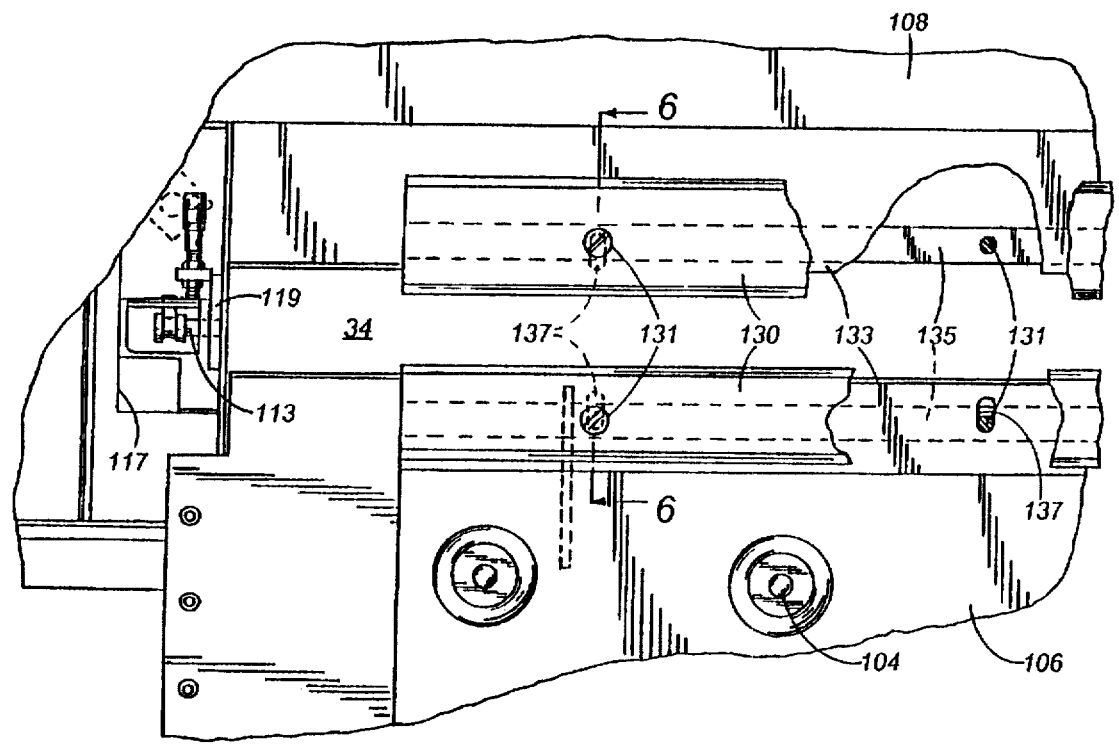
FIG. 5 is a partial top view of the table showing the slot-like opening and the adjustable workpiece supports.

Workpiece 30 is supported along slot 34 by a pair of long, bar-like supports 130. Supports 130 do not move upward to support the workpiece during a cut as is required by certain prior art devices. Rather, supports 130 are positioned in the plane of table 32 and therefore are always in engagement with, and are supporting, workpiece 30. Moreover, the width of slot 34 is adjustable via manual manipulation of supports 130 as shown in FIGS. 5 and 6. For example, if the material being cut is relatively thin and will not produce much slag 48, slot 34 can be relatively narrow. If the material being cut is thick and therefore generates a large amount of slag 48, slot 34 can be relatively wide. The width of slot 34 is adjusted through a plurality of bolts 131 which pass through supports 130 and plates 133, and fasten to bars 135. As shown in FIG. 5, bars 135 extent the length of supports 130. Plates 133 are provided with a number of elongate slots 137 corresponding to the number of bolts 131 which allow the bolts to be positioned at various positions depending on the desired width of slot 34.

Table 32 is comprised of discharge portion 106 and stationary portion 108. As best shown in FIG. 2, discharge portion 106 is adapted to both lower and tilt once a pattern 28 is cut or punched from workpiece 30, and it is desired to remove pattern 28 from the remaining skeleton of workpiece 30. By dropping discharge portion 106 downward as shown in FIG. 2, pattern 28 will drop away from skeleton 31, and further processing of workpiece 30 can continue. The movement of discharge portion 106 is controlled by pneumatic arm 110 and pivot slot 112. Pneumatic arm 110 includes cylinder 114 with ram 116 telescopingly received therein and is connected to machine support 44 at bottom pivot 118 while ram 116 is connected to discharge portion 106 at top pivot 120. As discharge portion 106 is lowered via pneumatic arm 110 a distance equivalent to the length of slot 112 (20 mm in the preferred embodiment), pins 113, which are attached to or made integral with discharge portion 106, also drop within slot 112 provided in mounting brackets 119. After reaching bottom 111 of slot 112, discharge portion 106 is tilted about pins 113 as shown in FIG. 2 to remove patterns 28. Discharge portion 106 also includes leveling arm 115 which assists ram 116 in pushing discharge portion 106 upward in a level manner a distance equal to the length of slot 112. As best shown in FIG. 5, access opening 117 is provided to allow an operator to insert a screwdriver or similar tool to pry pin 113 out of slot 112 when it is desired to remove discharge portion 106 for maintenance or replacement purposes. In addition to removing pins 113 from slots 112, pivot pin 120 has to be disconnected to remove discharge portion 106. Discharge portion 106 includes angled portion 76 which cooperates with angled portion 76 formed in duct 54 to guide slag 48 away from slit 34 and into slag tray 50 during normal operation.

In operation, workpiece 30 is positioned on table 32 of machine tool 20. Depending on the type and shape of the aperture to be cut in workpiece 30, either melting tool 22 or ram 24 will be used. Regardless of whether melting tool 22 or ram 24 is used, workpiece 30 will be positioned over table 32 via clamps 100 secured to workpiece 30 and rail 101 for numerically controlled movement along the X axis.

In order to remove slag 48 cut by melting tool 22, slot 34 is provided in table 32. Slag 48 falls through slot 34, through plenum 54 and into slag tray 50. Since plasma torch 22 is able to move along the Y axis, slot 34 is provided through the entire depth of table 32, and plenum 54 and slag tray 50 are also provided with widths which span across table 32.

Slag 48 falls to bottom 56 of slag tray 50, and vacuum source 52 draws fine particles and gases 46 away from slag tray 50 through outlet 84. In order to prevent sparks and/or the slag 48 from being communicated to vacuum source 52 and thereby creating a potentially hazardous explosion, the present invention is provided with labyrinthine spark trap 78. Spark trap 78 creates a maze-like flow path which hinders the progress of sparks and/or slag from bottom 56 of slag tray 50 toward vacuum source 52. Partition 64, protrusions 82, barrier 83, and cavity side walls 87 cooperate to form the labyrinthine flow path of the spark trap 78. The risk of an explosion resulting from a spark being communicated from slag tray 50 to the vacuum source 52 is thereby substantially eliminated.

Finally, in order to remove patterns 28 cut from workpiece 30, table 32 is provided with a discharge portion 106 which is capable of being lowered and tilted. Once patterns 28 are cut or punched from workpiece 30, clamps 100 move workpiece 30 to discharge portion 106, whereupon pneumatic arm 110 and slot 112 cooperate to both lower and tilt discharge portion 106 as depicted in the phantom lines shown in FIG. 2. Patterns 28 then drop from skeleton 31 to a conveying mechanism or a receptacle (not shown) for further handling.

From the foregoing, it is apparent that the present invention brings to the art a new and improved machine tool in which the risk of explosion due to molten metal and/or sparks being communicated to a vacuum source is substantially eliminated. Moreover, the present invention brings to the art a new and improved punch press with a high-energy thermal cutting device which is able to traverse the entire depth of a given piece of metal stock from the front to the rear edges of the worktable. The slag tray which collects the molten metal is correspondingly made a necessary depth. Furthermore, in order to efficiently remove a processed metal stock piece from the press, the present invention provides a mechanism for lowering and tilting a discharge portion to enable the pattern cut from the workpiece to drop away, leaving the skeleton of the workpiece for further processing.

What is claimed is:

1. A numerically controlled punch press with a metal melting capability in which a punch and the melting tool are mounted in a workhead supported on an overhead bridge and are adapted for numerically controlled movement along the length of a first axis, the workpiece is mounted on a fixed worktable for numerically controlled movement along a second orthogonal axis over the fixed worktable, and the punch press includes a slag collection system comprising, in combination:

a rectangular plenum mounted below the worktable and having a long, narrow, slot-like opening in a top thereof and an open bottom spanning the worktable along the first axis;

workpiece supports positioned in the plane of the worktable and positioned to define the slot-like opening into the enclosure in a position which is congruent with a path of the melting tool as the melting tool moves along the length of the first axis;

a slag tray for closing the open bottom of the rectangular enclosure, the slag tray extending the length of the slot-like opening; and a vacuum source connected to the plenum at a plenum extension which is located out of alignment with the slot-like opening, a spark trap interposed within the extension between the vacuum source and the plenum and creating a flowpath for air between the slot-like opening and the vacuum source.

2. The punch press of claim 1 wherein the vacuum source is connected to the plenum above the level of the slag tray.

3. The punch press of claim 1 wherein the rectangular enclosure includes angled portions adjacent the work table for directing the slag downward, and slag repelling baffles are attached to the angled portions.

4. The punch press of claim 3 wherein the slag repelling baffles are manufactured from steel sheets with a coating of chrormium disposed thereon.

5. The punch press of claim 4 wherein the baffles are manufactured from 1020 steel.

6. The punch press of claim 1, wherein the slag tray is provided on casters to facilitate insertion and removal thereof.

7. The punch press of claim 1, wherein the spark trap includes a partition disposed in the slag tray and a plurality of barriers disposed in the plenum extension wherein the partition and the barriers cooperate to define a labyrinthine flow path from the tray to the vacuum source, and dropout areas in the tray for collecting particles removed by the spark trap.

8. The punch press of claim 1, wherein the vacuum source is also in communication with the plasma torch and draws gases and particles from the plasma torch directly to the vacuum source.

9. A numerically controlled punch press with a metal melting capability in which a punch and the melting tool are mounted in a work head supported on an overhead bridge and are adapted for numerically controlled movement along the length of a first axis, the workpiece is mounted on a worktable for numerically controlled movement along a second orthogonal axis, and the punch press includes a slag collection system comprising, in combination:

a rectangular plenum mounted below the worktable and having a long, narrow, slot-like opening in a top thereof and an open bottom;

workpiece supports positioned in the plane of the worktable in position to define the slot-like opening into the enclosure in a position which is congruent with a path of the melting tool as the melting tool moves along the length of the first axis, the worktable including a discharge portion carrying one of the workpiece supports and being disposed on one side of the slot-like opening, and means for lowering and tilting the discharge portion, whereby patterns cut from the workpiece can be discharged from the press by activating the discharge means to lower and thereby allow the pattern to drop from the workpiece, and tilt the discharge portion and thereby allow gravity to remove the pattern therefrom;

a slag tray for closing the open bottom with the rectangular enclosure, the slag tray extending the length of the slot-like opening; and a vacuum source connected to the plenum at a plenum extension which is located out of alignment with a slot-like opening, a spark trap interposed within the extension between the vacuum source and the plenum and creating a flow path for air between the slot-like opening and the vacuum source.

10. The punch press of claim 9, wherein the lowering and tilting means includes a pneumatic arm attached to the discharge portion, and a pair of pins attached to the discharge portion and pivotally disposed within elongate slots attached to the rectangular enclosure, whereby the discharge portion drops a distance equivalent to the distance of the slots, and then pivots about the pins when the pneumatic arm retracts.

11. The punch press of claim 1 further including clamps operably connected to the metal stock and a rail disposed alongside the worktable to move the workpiece along the first axis.

12. The punch press of claim 1 wherein the workpiece supports are adjustable relative to each other to thereby adjust the width of the slot-like opening to the plenum.

13. A method for cutting a pattern from metal stock disposed on a positionally fixed worktable and removing the slag created from the cutting comprising the steps of:

numerically controlling the position of a high-energy, thermal melting device along a first axis and the position of a workpiece along a second orthogonal axis;

fixedly locating a plenum with a narrow slot-like entrance along the path of melting device travel so that slag produced as a result of the cutting falls through the slot-like opening, the slot-like opening spanning the worktable along the first axis;

supporting the workpiece at the slot-like opening to prevent sagging during cutting;

creating a vacuum in the plenum to draw slag and fumes through the slot-like opening and into the plenum;

collecting slag at the bottom of the plenum in a tray as long as the slot-like opening; and interposing a spark trap between the slot-like opening and a source of the vacuum, the spark trap having baffles for preventing sparks from reaching the vacuum source.

14. The method of claim 13 further including the step of providing slag-repellent baffles on inside surfaces of the plenum to prevent slag from accumulating on the inside surfaces of the plenum.

15. The method of claim 13 further including the step of adjusting the positions at which the supporting step is performed depending the thickness of the metal stock being cut.

16. A numerically controlled punch press with a metal melting capability wherein the punch press includes a slag collection system comprising, in combination:

a plenum mounted below the worktable and having a slot-like opening in a top thereof, an open bottom for removal of slag created by the melting tool to a collection device, and angled baffle plates leading from the top to the open bottom, the baffle plates being removable for replacement or cleaning, and being provided with a slag-repelling coating to prevent slag from accumulating on the baffles and clogging the plenum.

* * * * *